United States Patent
Richtsmeier et al.

(10) Patent No.: US 6,819,452 B1
(45) Date of Patent: Nov. 16, 2004

(54) METHOD AND SYSTEM FOR MODIFYING PORTIONS OF AN IMAGE BIT STREAM REPRESENTING PRINTING HORIZONTAL LINES AND EDGES TO IMPROVE PRINT QUALITY

(75) Inventors: Dean Richtsmeier, Boise, ID (US); David R. Larson, Eagle, ID (US); Brent D. Rasmussen, Meridian, ID (US); Bruce J. Jackson, Star, ID (US); Douglas G. Keithley, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 861 days.

(21) Appl. No.: 09/656,579

(22) Filed: Sep. 6, 2000

(51) Int. Cl.[7] .................................................. G06K 1/00
(52) U.S. Cl. ..................... 358/1.9; 347/131; 382/266
(58) Field of Search .................. 382/254, 256, 382/258, 266; 358/1.1, 1.9; 347/129, 131

(56) References Cited

U.S. PATENT DOCUMENTS

| | | | | |
|---|---|---|---|---|
| 4,967,211 A | * | 10/1990 | Colby et al. | 347/131 |
| 5,887,222 A | * | 3/1999 | Sako | 399/51 |
| 6,177,948 B1 | * | 1/2001 | Estabrooks et al. | 347/129 |

* cited by examiner

*Primary Examiner*—Thomas D. Lee (57) ABSTRACT

A system and method for minimizing distortion in printed images due to toner explosion receives the incoming image bit stream and monitors the stream for horizontal lines and edges that would be particularly susceptible to toner explosion distortion. When such features are determined, the bit stream is modified to print an outlined area with a fill pattern therein. This decreases the amount of toner used to print the horizontal line or edge. As less toner is required, toner piles transferred to the paper are shorter and, therefore, tend to generate less distortion when toner explosions occur.

15 Claims, 7 Drawing Sheets

METHOD AND SYSTEM FOR MODIFYING PORTIONS OF AN IMAGE BIT STREAM REPRESENTING PRINTING HORIZONTAL LINES AND EDGES TO IMPROVE PRINT QUALITY

FIELD OF THE INVENTION

The present invention relates to the field of laser printers, laser copiers, photocopiers, laser fax machines and other image printing devices which use light to write an image to the electric charges on a printing drum. More particularly, the present invention relates to the field of minimizing toner explosions in such image printing devices, where such toner explosions are caused by the vaporization of moisture in the paper when the toner is fixed to the paper by exposure to a heating element.

BACKGROUND OF THE INVENTION

Photocopiers operate on the following principles. An original document is laid on a glass window and illuminated from below by a powerful light. Typically, the light is scanned along the length of the original document. An optical system directs the light reflected from the document, i.e., an image of the document, to a printing drum. The printing drum is a cylindrical, metal drum which is given a negative charge at the beginning of the copying cycle. The drum is rotated as it is illuminated with the image of the document so that the image of the document is evenly and proportionally illuminated along the circumference of the drum without overlapping.

Where the image on the original document was bright, a relatively large amount of light will be reflected and directed to the printing drum. Conversely, where the image on the original document was dark, relatively little light is reflected to the printing drum.

The negative charge on the printing drum is dissipated in proportion to the amount of light falling thereon. Consequently, the image from the original document is effectively transferred to the charges on the printing drum, there remaining, for example, a substantial negative charge at darker portions of the image and little or no negative charge at the brighter portions of the image.

Positively charged toner is then applied to the printing drum. As positive and negative charges attract, the positively charged toner adheres to the printing drum in the pattern defined by the negative charge remaining on the drum, i.e., the dark or darker portions of the image. The stronger the negative charge on the drum, the more toner will adhere. The toner on the drum is then transferred to a piece of paper, thereby printing the image of the original document on the paper. The toner is then fixed or sealed to the paper by a heating element. Copying is then complete.

A laser printer works on the same general principles. However, instead of using an optical image obtained by illuminating an original, the laser printer receives a bit stream composed of digital data defining the light and dark portions of the image using a gray or color scale. This bit stream is used to modulate the light from a laser that is scanned over the printing drum.

In further contrast to a photocopier, where the bit stream defines a dark portion of the image, the laser will strongly illuminate the printing drum to dissipate the negative charge. Where the bit stream defines a light portion of the image, the laser may illuminate the drum weakly or not at all.

Negatively charged toner, rather than positively charged toner, is then applied to the printing drum. The negatively charged toner is repelled by the areas of the drum on which a negative charge remains (the light portions of the image) and adheres to the pattern of areas where the negative charge has been depleted from the drum by the laser in accordance with the image bit stream. The toner is then transferred to paper and heat sealed by, for example, a fuser nip.

A problem known as toner explosion occurs in all such laser and photocopier imaging systems. Toner explosion occurs when the toner, which has been transferred to paper, is sealed to the paper using the heat of a heating element. If there is moisture in the paper, as is common, that moisture will tend to suddenly vaporize when exposed to the heat that is applied to seal the toner. The sudden vaporization of the moisture in the paper may spread the pile of unsealed toner. Consequently, at that portion of the image, the toner is fixed in the resulting explosion pattern and degrades the image being printed.

Toner explosion problems are particularly frequent and noticeable when the printer is printing a solid horizontal line or edge and the moisture has no escape route without disturbing a toner pile. Typically, the explosion spreads toner below the line or edge, in a direction away from the direction in which the paper is being fed through the printing device to the heating element. The spread toner is then sealed to the paper in the unintended explosion pattern rather than as part of the horizontal line or other image element defined by a horizontal edge. These explosions are all the more noticeable against the straight horizontal line or edge from which they extend.

Consequently, in the field of laser imaging devices, there is a need in the art for a system and method of printing horizontal lines and edges, in particular, without causing toner explosions when the toner is heat-sealed to the paper or other print medium.

SUMMARY OF THE INVENTION

The present invention is directed to a system and method of printing horizontal lines and edges, in a laser printing device or digital copier, while reducing the distortion caused by toner explosions when the toner is heat-sealed to the paper or other print medium.

The present invention may be implemented in an image printing device in which a laser or other light source is modulated in accordance with an image bit stream in order to represent an image in charges on a printing drum which then transfers toner, directly or indirectly, to a print medium in accordance with the resulting charge pattern on the printing drum. In such an image printing device, the present invention preferably includes an input for receiving the image bit stream; and a processor for processing the image bit stream. The processor identifies segments of the image bit stream representing substantially solid horizontal lines or edges which are susceptible to distortion by toner explosions. The processor then modifies the segments of the image bit stream representing a substantially solid horizontal line or edge so as to decrease the amount of toner and toner pile heights that result at those portions of the printed image. This minimizes distortion caused by toner explosions. Specifically, the processor modifies the image bit stream representing a substantially solid horizontal line or edge such that the modified bit stream then represents an outlined area containing a fill pattern that replaces the substantially solid horizontal line or edge.

As will be appreciated by those skilled in the art, the modification of the image bit stream could also be accomplished by a processor in a host computer or printer client device before the image bit stream is transmitted to the image printing device.

Image printing devices in which the invention may be implemented will typically also include a light source driver and a light source (e.g. a laser). The driver drives the laser in accordance with the image bit stream as modified. Preferably, the modified bit stream is modified so as to cause the laser to make a center justified mark of a particular width in each pixel of the fill pattern. More preferably, the modified bit stream is modified so as to cause the laser to make marks in pixels in a single column of pixels with different justifications. Specifically, the modified bit stream preferably causes the laser to make center-justified marks in a first row of pixels of the fill pattern and split-justified marks in a second row of pixels of the fill pattern.

The present invention also encompasses the methods of making and operating the system described above. Specifically, the present invention encompasses the method of minimizing distortions due to toner explosions in images produced by an image printing device in which a laser is modulated in accordance with an image bit stream in order to represent an image in charges on a printing drum which then transfers toner to a print medium accordingly to complete printing, by monitoring the image bit stream to identify segments of the image bit stream representing substantially solid horizontal lines or edges which are susceptible to distortion by toner explosions; and modifying the segments of the image bit stream representing a substantially solid horizontal line or edge which is susceptible to distortion by toner explosions so as to decrease an amount of toner and toner pile heights resulting in those portions of a printed image corresponding to the identified segments of the image bit stream representing a substantially solid horizontal line or edge so as to minimize distortion caused by toner explosions.

The present invention also encompasses the software or computer-readable instructions that cause the printing device to implement the present invention in which the fill pattern replaces horizontal lines and edges to minimize distortion due to toner explosions.

BRIEF DESCRIPTION OF THE DRAWINGS

The accompanying drawings illustrate various exemplary embodiments of the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
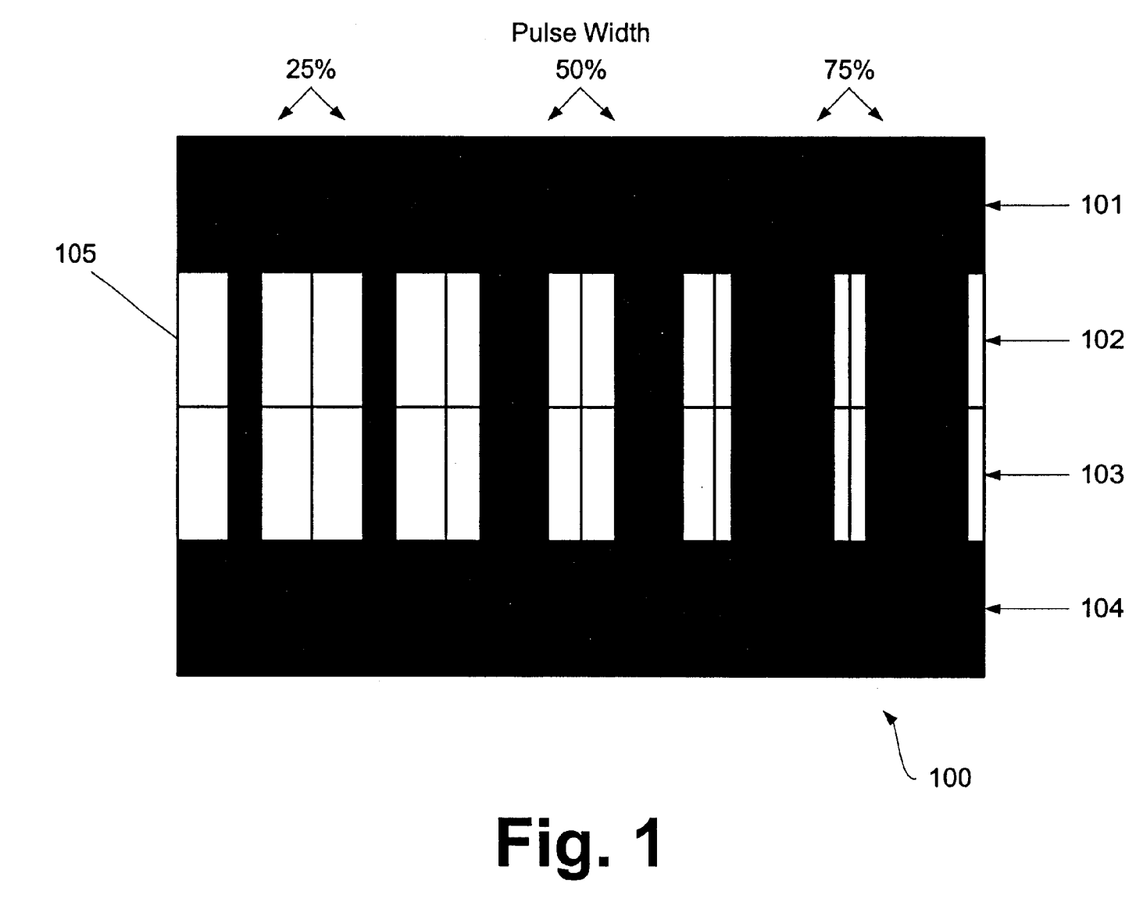
FIG. 1 is an enlarged illustration of a segment of a horizontal edge or line printed according to a first embodiment of the present invention.
Figure 2:
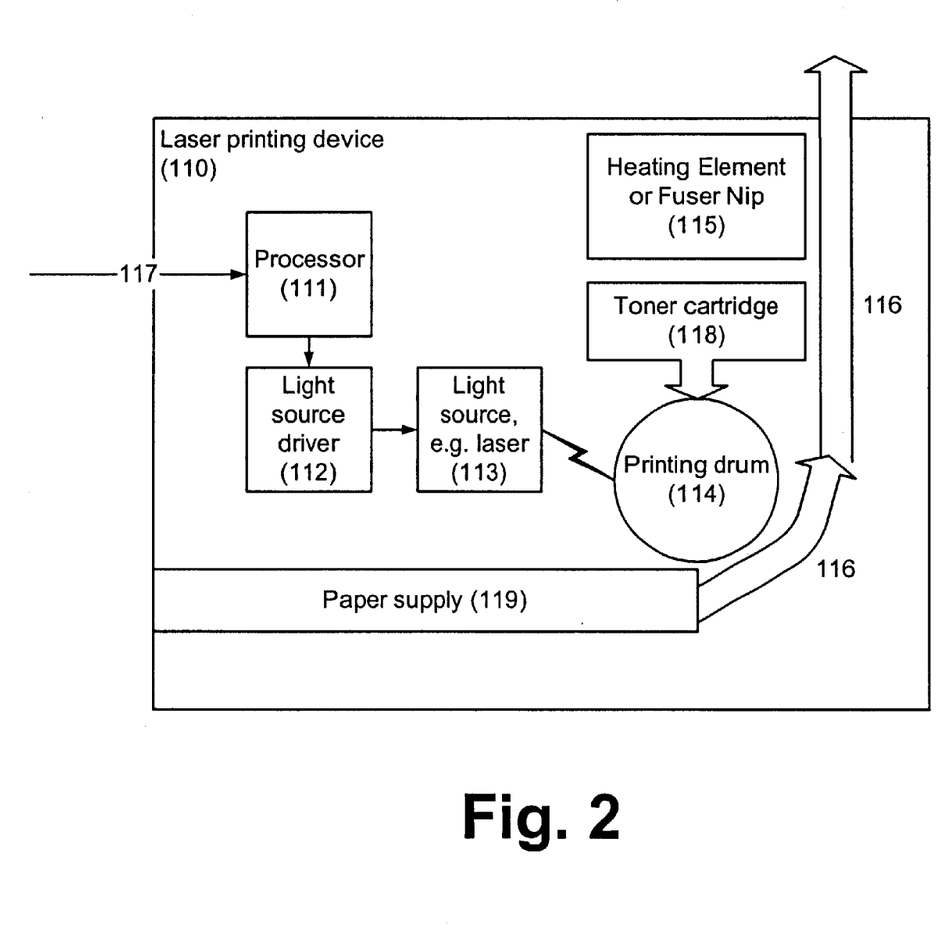
FIG. 2 is a block diagram of an image printing system used to implement the present invention.
Figure 3:
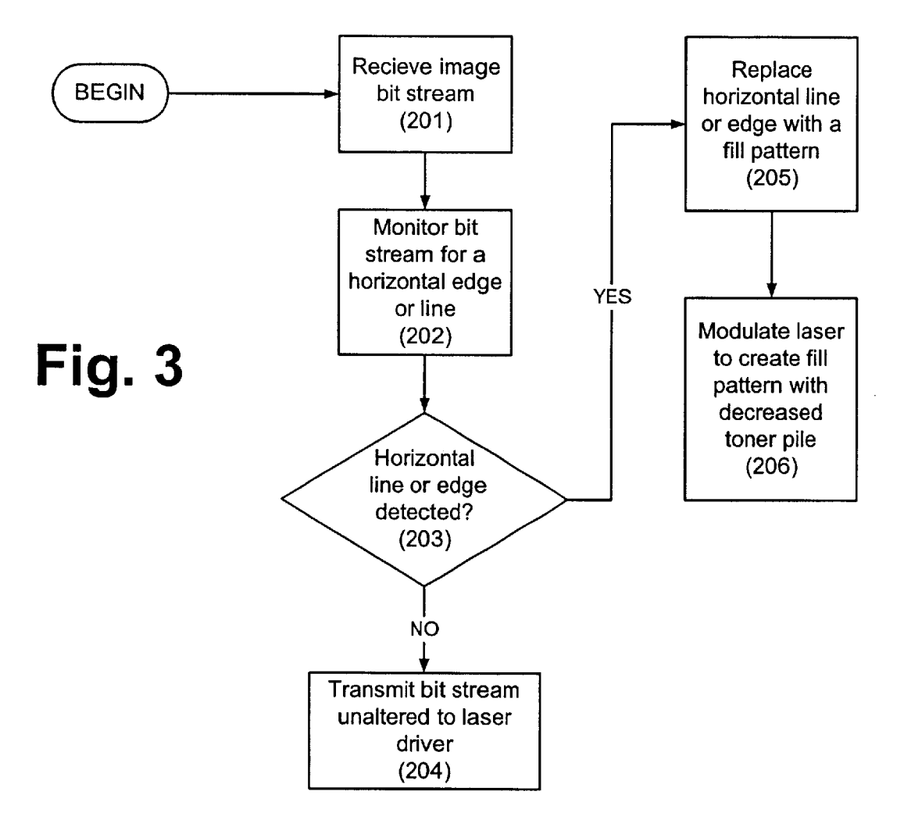
FIG. 3 is a flow chart illustration the method of the first embodiment of the present invention.

FIGS. 1 to 3 illustrate a first embodiment of the present invention. As described in detail below, the system of the invention monitors the image bit stream for horizontal edges or lines which may be highly susceptible to distortion from toner explosions. When such horizontal elements are detected, rather than printing the continuous, dark horizontal element, the bit stream is altered to provide a fill pattern between, for example, solid single-pixel horizontal lines. The result appears as a solid horizontal line or edge but requires less toner. Consequently, with smaller toner piles, toner explosions will be less extensive and noticeable in the final printed image.

FIG. 2 is a block diagram of a printing device (110) according to the present invention. This device (110) could be a laser printer, digital copier, laser fax machine or any other image printing device in which the image is transferred to paper by modulating a laser or other light source according to an image bit stream to selectively illuminate a printing drum and write the image to the charge-distribution on the drum, the image being printed by development of a charged toner to the charge pattern on the drum. As shown in FIG. 2, an image bit stream (117) is received by the processor (111) of the printing device (110). The bit stream (117) is processed by the processor (111) in a manner that will be described in detail below.

The processor (111) then uses the bit stream (117) to control a laser driver (112). The laser driver (112), in turn, drives a laser (113) to selectively illuminate the printing drum (114) in accordance with the image described by the bit stream (117). As described above, the laser (113) consequently writes the image to the charges on the printing drum (114) by selectively dissipating negative charges thereon.

Negatively charged toner is then supplied from a toner cartridge (118) to the drum (114). The negatively charged toner is repelled by the negative charges remaining on the drum (114), but adheres to regions of the drum where the negative charge has been dissipated by exposure to the light of the laser or other light source. Paper from a paper supply (I 19) is then moved along a transport path (116). The printing drum (114) is rolled over the paper so that the toner is transferred from the drum (114) to the paper.

The paper is then passed through or by a heating element, usually called the fuser nip (115). Heat from the fuser nip (115) seals the toner to the paper in the transport path (116) and may, as described above, cause toner explosions.

As shown in FIG. 3, an exemplary method of the present invention begins when the processor (111) receives the image bit stream (117); (201). The processor (111) monitors the image bit stream (117) for horizontal lines and edges; (202). Horizontal lines and edges may be identified as follows.

Typically, each image is divided into pixels. The pixels are squares in a grid. The bit stream (117) contains information for each pixel that determines at what portion of the pixel the laser should be on (location or justification) and for how long (pulse width). For example, the bit stream (117) may, for each pixel, include two bits of location information specifying whether the laser is to illuminate the pixel at the left, right, center or split the pulse equally between left and right sides of the pixel (justification). The bit stream (117)

then includes, for each pixel, six bits of data defining the width of the pulse as a fraction of the width of the pixel. Thus, the bit stream (117) may include eight bits of data per pixel.

Referring to FIG. 1, an exemplary pixel (105) is illustrated for which the bit stream turned the laser on at the center of the pixel (justification) for one quarter (25%) of the width of the pixel (pulse width). FIG. 1 illustrates a section of a pixel matrix measuring four rows of pixels by six columns of pixels.

In the present example, a horizontal edge or line would be identified when four consecutive rows of pixels have a 100% pulse width instruction for a predetermined number of pixel columns. The number of pixel columns may be determined based on the sensitivity of the application to toner explosion distortion. For example, a window which is five pixels by five pixels appears to be the effective minimum for considering whether a horizontal edge or line is present which should be modified for printing. More preferably, a window that is seven pixels wide by five pixels high allows the processor to identify horizontal lines and edges required modification more effectively.

If no horizontal edge or line is detected, the processor (111) passes the bit stream data on to the laser driver without alteration (204). However, if a horizontal edge or line is detected, the processor (111) rewrites the portion of the bit stream corresponding to the line or edge to decrease the resulting toner pile (205).

As shown in FIG. 1, the bit stream is altered as follows. In the example of FIG. 1, where a line or image segment (100) provides four rows of a solid horizontal line or edge, the top row (101) and the bottom row (104) of the four row set are printed as specified in the bit stream (117), i.e., with 100% pulse width in each pixel. However, rather than print the middle two rows (102, 103) in the same manner, the bit stream (117) is revised by the processor (111) to print a fill pattern between the top and bottom rows (101, 104).

As shown in FIG. 1, the fill pattern is preferably a series of center justified pulses which have an appropriate pulse width. The center justified pulses result in the center justified marks illustrated in the pixels of the middle two rows (102, 103). The width of the marks is determined by the pulse width. In FIG. 1, the first two columns show marks resulting from a 25% pulse width. The middle two columns show marks resulting from a 50% pulse width. And, the right two columns show marks resulting from a 75% pulse width.

The pulse width of the marks in the fill pattern can be determined based on how dark the line or edge being represented is supposed or desired to be. This determination may be based on printer resolution and other printing parameters, such as user-controlled features that economize on toner usage. The pulse width of the marks in the fill pattern is preferably static throughout the fill pattern, but could by cycled or varied as needed. As will be understood by those skilled in the art, implementing a constant fill pattern is simpler and will satisfy the purpose of minimizing toner explosions.

The same applies to varying mark justification within a row (101–104). Constant justification is simpler to implement and satisfactorily minimizes toner explosions. However, varying the justification of the marks in the fill pattern is possible and within the scope of the present invention. If the justification is static, as in FIG. 1, the justification can be any of the available justifications and need not be center-justified. In other words, the marks may be consistently right, left, center or split justified.

Once the bit stream (117) has been modified to include the fill pattern described above in place of a completely dark horizontal line or edge (205), the modified bit stream is used to modulate the laser to print the fill pattern in place of a solid horizontal line or edge (206). Consequently, because the resulting "striped" fill pattern, shown in FIG. 1, requires less toner and, therefore, forms smaller toner piles when toner is transferred to the drum (114) than would be the case if all pixels in the segment (100) with printed at 100% pulse width, toner explosions have less toner to spread in unwanted explosion patterns. Consequently, the quality of the image is maintained and distortion due to toner explosion is minimized.

Figure 4:
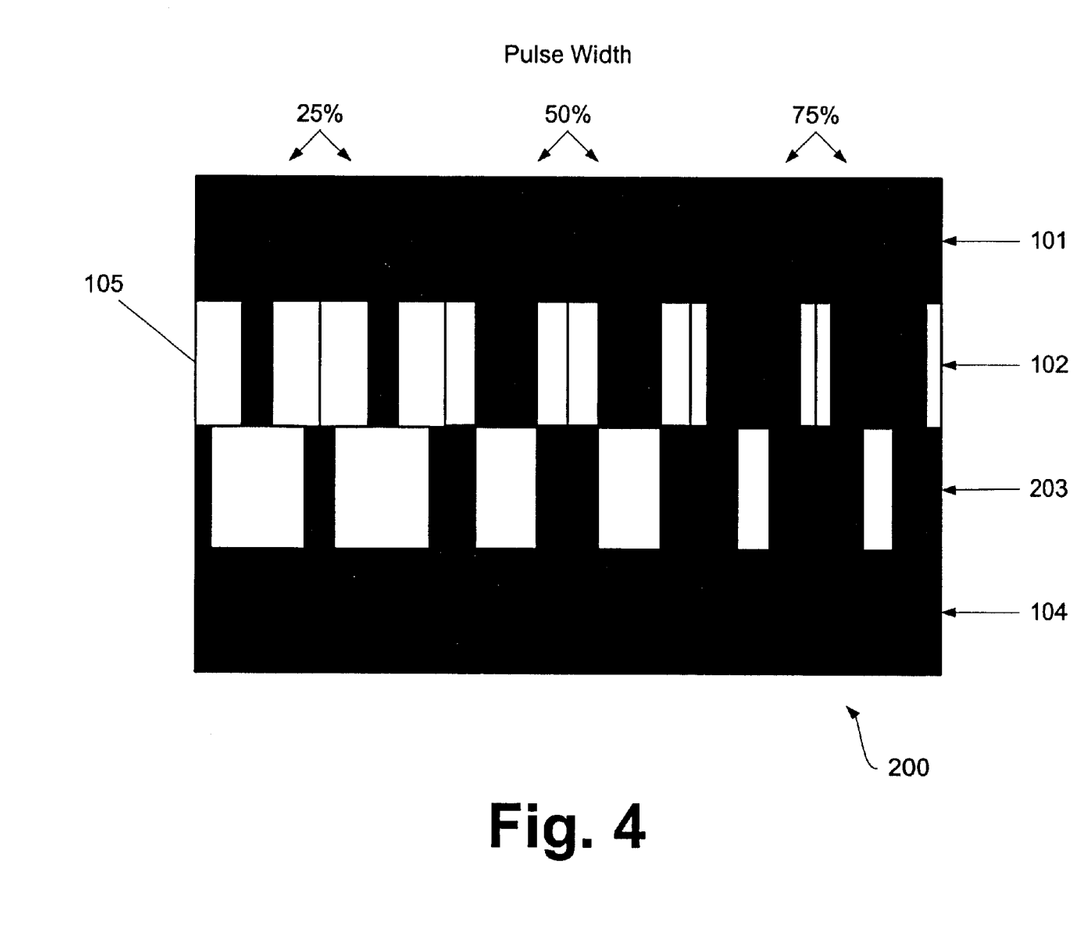
FIG. 4 is an enlarged illustration of a segment of a horizontal edge or line printed according to a second embodiment of the present invention.
Figure 5:
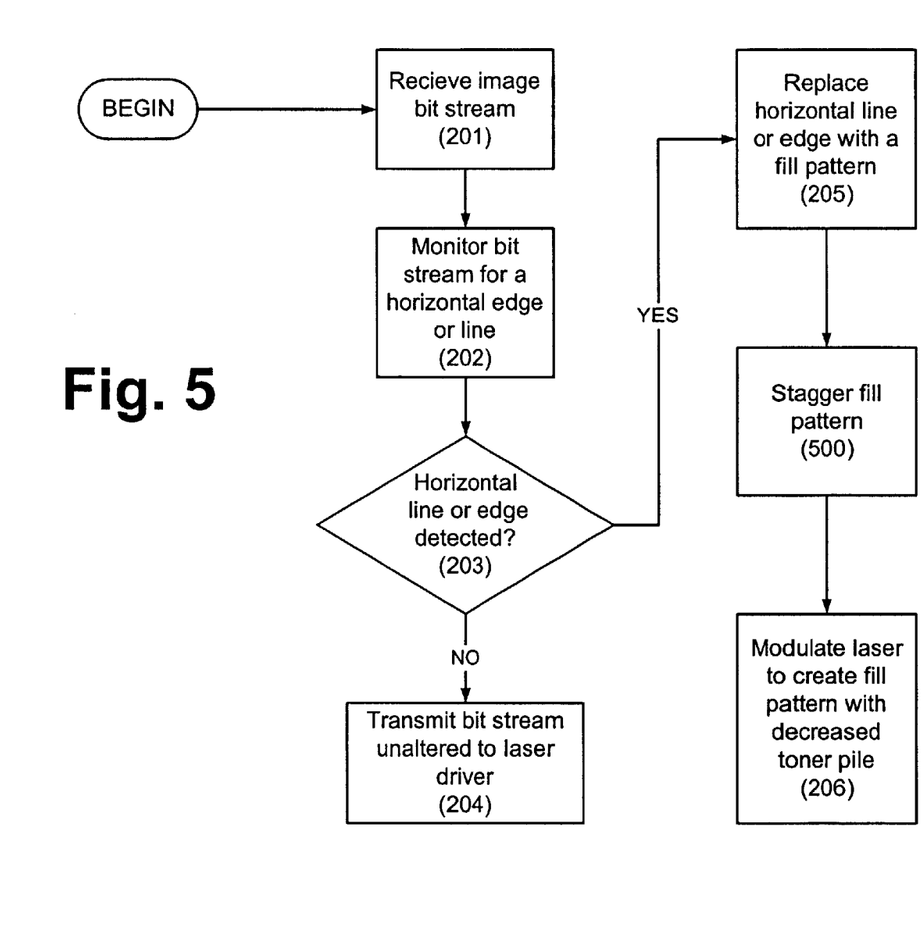
FIG. 5 is a flow chart illustration the method of the second embodiment of the present invention.

FIGS. 4 and 5 illustrate a second, more preferred, embodiment of the present invention. As illustrated in FIGS. 4 and 5, the imaging printing device receives the bit stream (201), monitors the bit stream for horizontal edges or lines (202) and modifies the bit stream where such features are found to minimize toner piles that are susceptible to being spread by toner explosions.

However, when the horizontal line or edge is replaced with a fill pattern, the marks in the fill pattern are staggered (500) as shown in FIG. 4. For example, the first line of the fill pattern (102) may consist of center justified marks, as before. However, the second line (203) may consist of split-justified marks, i.e. a mark of half the total specified width is made at each of the right and left sides of the pixel. (See FIG. 5).

In this way, the "striped" pattern of FIG. 1 becomes a "checkerboard" or staggered pattern as shown in FIG. 5. Consequently, because the toner piles corresponding to the marks are further divided and separated, a toner explosion at any particular location is less likely to spread as much toner. In this way, distortion due to toner explosion is further minimized.

Any variation in justifications between the patterned rows (102, 203) is within the scope of the present invention. The marks of row (102) can be center, right, left or split justified, while the marks of row (203) can have any justification other than that of the marks in row (102).

Alternatively, as mentioned above the justifications can vary within a single row (102 or 203). However, for ease of implementation while minimizing toner explosion effects, the checkerboard pattern created by the marks of FIG. 4 is expected to be the best implementation of the present invention.

Figure 6A:
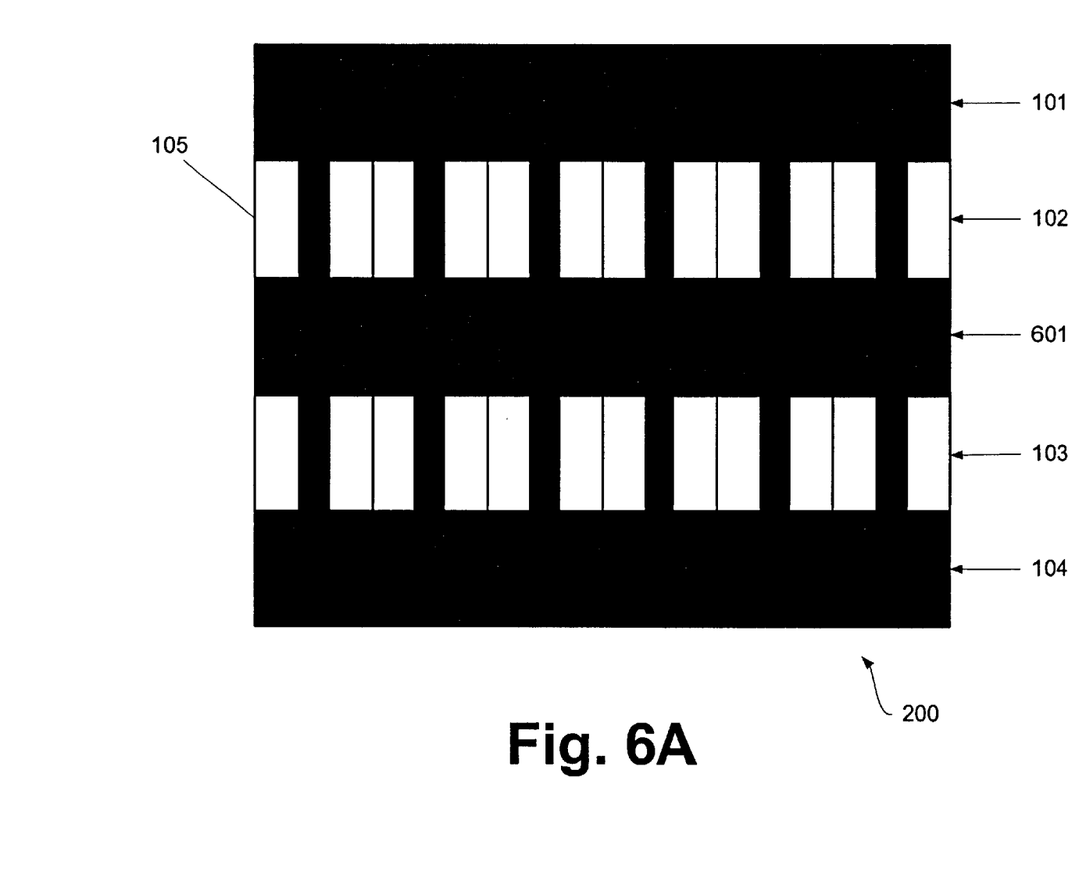
FIG. 6A is an enlarged illustration of a segment of a horizontal edge or line printed according to a third embodiment of the present invention.
Figure 6B:
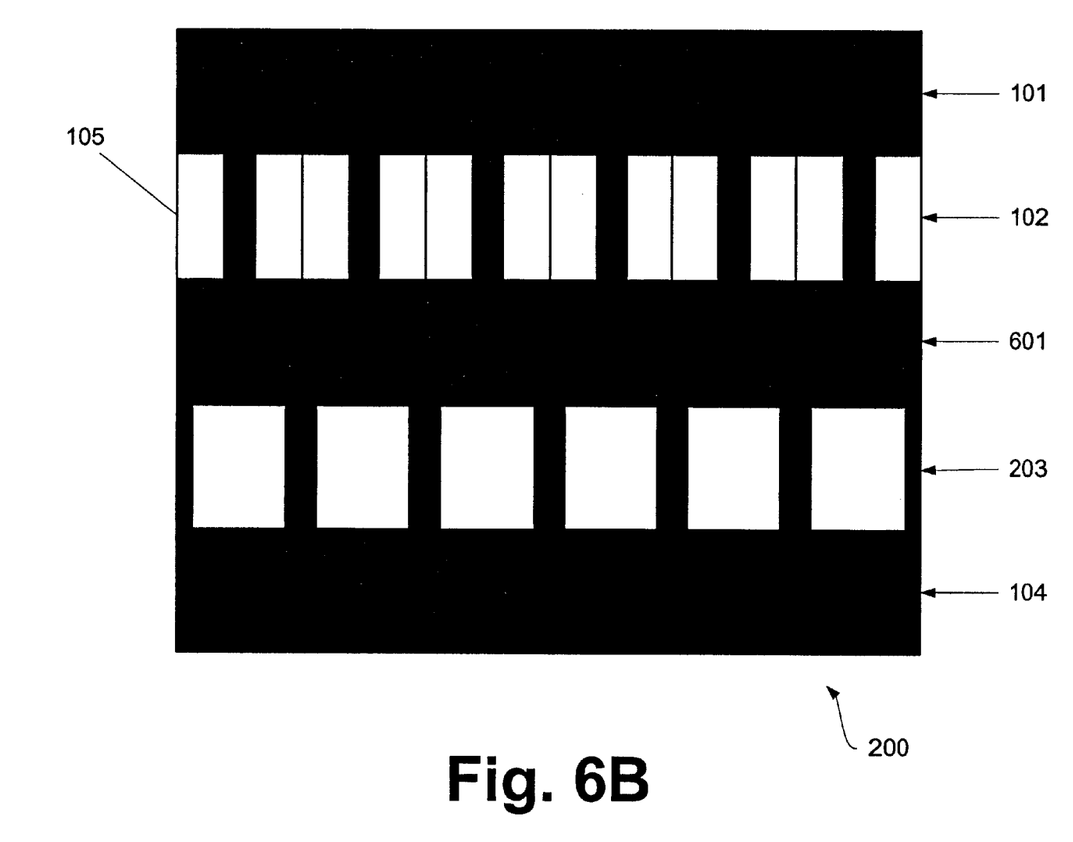
FIG. 6B is an enlarged illustration of a segment of a horizontal edge or line printed according to a fourth embodiment of the present invention.

FIGS. 6A and 6B illustrate embodiments of the invention in which the horizontal line or edge has a thickness more than four pixel rows. As shown in FIG. 6A, a preferred method of dealing with a five pixel line would be to alternate solid and patterned rows. In other words, solid printed pixel rows become part of the fill pattern. The outside rows (101, 104) are solid as in the examples given above. The central row (601) in the fill pattern is also solid. The rows of the fill pattern immediately inside (102, 103) the outside rows (101, 104) are made with marks that are less than the full width of the pixel.

For simplicity, the marks in lines (102, 103) of FIG. 6A are shown as center-justified, 25% pulse width marks. However, as will be understood by those skilled in the art and as mentioned above, the marks could be of any other justification and pulse width (less than 100%) depending on the desired effect.

FIG. 6B is substantially similar to FIG. 6A, except that the two pattern lines (102, 203) are not similarly justified. The upper line (102) of the fill pattern has center-justified marks, while the lower line (203) of the fill pattern has split-justified marks. This is analogous to the embodiment pictured in FIG. 4 and is merely exemplary. As before the marks in each row may be of any justification so long as the justification is different for each of the rows (102, 203).

If the horizontal line or edge has more than five pixels in width, e.g. six or seven, it is preferred that the outside pixel lines be solid, the lines of the fill pattern immediately inside the outside lines be patterned as illustrated in either FIG. 6A or 6B, and the center lines of the fill pattern be solidly printed like the outside lines. Thus, for a horizontal line with six pixels of width, the pixel lines would have the following configuration (1) solid, (2) patterned, (3) solid, (4) solid, (5) patterned and (6) solid. Similarly, for a horizontal line with seven pixels of width, the pixel lines would have the following configuration (1) solid, (2) patterned, (3) solid, (4) solid, (5) solid, (6) patterned and (7) solid.

Finally, the present invention also encompasses software or computer-readable instructions which can be used to cause a processing device (e.g., 111) to accomplish the method of generating a fill pattern in place of a substantially solid horizontal line or edge in an image being printed. In this regard, computer-readable instructions include, but are not limited to, software, such as object or source code, written in any language, as well as firmware. The processing device or processor means receiving the instructions may be, but is not limited to, a host computer, a microprocessor (in a computer or printing device), an ASIC (in a computer or printing device) or firmware.

The computer-readable instructions of the present invention cause the processing device to monitor the image bit stream to identify segments of the image bit stream representing substantially solid horizontal lines or edges which are susceptible to distortion by toner explosions; and modifying those segments of said image bit stream so as to decrease an amount of toner and toner pile heights resulting in those portions of the printed image by substituting an outlined fill pattern for the solid horizontal lines or edges.

In summary, the principles of the present invention contribute in several ways to the minimization of distortions in the printed image due to toner explosions. First, because less toner is used and toner piles are shorter, less toner is spread if an explosion occurs. Second, a positive charge exists on the back side of the paper as it enters the fuser nip. This positive charges helps hold the negatively charged toner on the opposite paper surface while the toner is fused to the paper. With less toner applied under the principles of the present invention, the positive charge on the opposite side of the paper is more effective in holding the charged toner to the paper.

Additionally, there is a certain amount of repulsive force exerted among the negative charges of the toner pile. In other words, the toner pile is under some force to push itself apart due to the repulsion of like negative charges in the pile. A reduction in the size of the toner pile under the present invention helps to minimize this force trying to disperse the toner pile.

Finally, by creating a checkerboard pattern of minimized toner piles, moisture in the paper that vaporizes during the fusing of the toner is more likely to have a path of escape without disturbing a toner pile. Thus, the principles of the present invention help prevent distortion due to toner explosions in a variety of ways.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An image printing system in which a light source is modulated in accordance with an image bit stream in order to represent an image in charges on a printing drum, the system comprising:

said image bit stream; and a processor for processing said image bit stream; wherein;

said processor identifies segments of said image bit stream representing substantially solid horizontal lines or edges;

said processor modifies said segments of said image bit stream representing a substantially solid horizontal line or edge, said processor modifying said identified segments of said image bit stream so as to decrease an amount of toner resulting in those portions of a printed image corresponding to said identified segments of said image bit stream; and wherein said processor modifies said segments of said image bit stream representing a substantially solid horizontal line or edge such that said segments of said bit stream as modified represent an outlined area containing a fill pattern that replaces said substantially solid horizontal line or edge.

2. The system of claim 1, wherein said fill pattern comprises solid and patterned pixel rows.

3. An image printing system in which a light source is modulated in accordance with an image bit stream in order to represent an image in charges on a printing drum, the system comprising:

said image bit stream; and a processor for processing said image bit stream; wherein:

said processor identifies segments of said bit stream representing substantially solid horizontal lines or edges;

said processor modifies said segments of said image bit stream representing a substantially solid horizontal line or edge, said processor modifying said identified segments of said image bit stream so as to decrease an amount of toner resulting in those portions of a printed image corresponding to said identified segments of said image bit stream; and wherein said processor modifies said segments of said image bit stream representing a substantially solid horizontal line or edge such that said segments of said bit stream as modified represent an outline area containing a fill pattern that replaces said substantially solid horizontal line or edge; and an image printing device comprising
a light source driver; and
said light source,
wherein said light source driver drives said light source in accordance with said image bit stream as modified by said processor.

4. The system of claim 3, wherein said modified bit stream causes said light source to make a center justified mark of a particular width in each pixel of said fill pattern.

5. The system of claim 3, wherein said modified bit stream causes said light source to make marks in pixels in a single column of said fill pattern with different justifications.

6. The system of claim 5, wherein said modified bit stream causes said light source to make center-justified marks in a first row of pixels of said fill pattern and split-justified marks in a second row of pixels of said fill pattern.

7. A method of minimizing distortions due to toner explosions in images produced by an image printing device in which a light source is modulated in accordance with an image bit stream in order to represent an image in charges on a printing drum, the method comprising:

monitoring said image bit stream to identify segments of said image bit stream representing substantially solid horizontal lines or edges;

modifying said segments of said image bit stream representing a substantially solid horizontal line or edge so as to decrease an amount of toner resulting in those portions of a printed image corresponding to said identified segments of said image bit stream representing a substantially solid horizontal line or edge so as to minimize distortion caused by toner explosions; and wherein said modifying said image bit stream representing a substantially solid horizontal line or edge further comprises modifying said bit stream such that said bit stream represents an outlined area containing a fill pattern that replaces said substantially solid horizontal line or edge.

8. The method of claim 7, wherein said fill pattern comprises both solid and patterned rows of pixels.

9. A method of minimizing distortions due to toner explosions in images produced by an image printing device in which a light source is modulated in accordance with an image bit stream in order to represent an image in charges on a printing drum, the method comprising:

monitoring said image bit stream to identify segments of said image bit stream representing substantially solid horizontal lines or edges;

modifying said segments of said image bit stream representing a substantially solid horizontal line or edge so as to decrease an amount of toner resulting in those portions of a printed image corresponding to said identified segments of said image bit stream representing a substantially solid horizontal line or edge so as to minimize distortion caused by toner explosions;

driving a light source in accordance with said modified image bit stream; and wherein said modifying said image bit stream representing a substantially solid horizontal line or edge further comprises modifying said bit stream such that said bit stream represents an outlined area containing a fill pattern that replaces said substantially solid horizontal line or edge.

10. The method of claim 9, wherein said modifying said image bit stream further comprises modifying said bit stream to cause said light source to make a center justified mark of a particular width in each pixel of said fill pattern.

11. The method of claim 9, wherein said modifying said image bit stream further comprises modifying said bit stream to cause said light source to make marks in pixels in a single column of pixels with different justifications.

12. The method of claim 11, wherein said modifying said image bit stream further comprises modifying said bit stream to cause said light source to make center-justified marks in a first row of pixels of said fill pattern and split-justified marks in a second row of pixels of said fill pattern.

13. Computer-readable instructions stored on a media for recording computer-readable instructions, wherein said instructions cause a processing device to monitor an image bit stream to identify segments of said image bit stream representing substantially solid horizontal lines or edges which are susceptible to distortion toner explosions; and modify said segments of said image bit stream representing a substantially solid horizontal line or edge so as to decrease an amount of toner and toner pile heights resulting in those portions of a printed image corresponding to said identified segments of said image bit stream representing a substantially solid horizontal line or edge so as to minimize distortion caused by toner explosions when said image is printed by an image printing device in which a light source is modulated in accordance with said image bit stream in order to represent said image in charges on a printing drum; and wherein said instructions further cause said processing device to modify said image bit stream representing a substantially solid horizontal line or edge such that said bit stream an modified represents an outlined area containing a fill pattern that replaces said substantially solid horizontal line or edge.

14. The computer-readable instructions of claim 13, wherein said instructions further cause said processing device to modify said bit stream to cause said light source to make a center justified mark of a particular width in each pixel of said fill pattern.

15. The computer-readable instructions of claim 13, wherein said instructions further cause said processing device to modify said bit stream to cause said light source to make marks in pixels in a single column of pixels with different justifications within said fill pattern.

* * * * *